United States Patent
Supplisson et al.

(10) Patent No.: US 9,983,921 B2
(45) Date of Patent: *May 29, 2018

(54) DATA LIFECYCLE MANAGEMENT

(71) Applicant: International Business Machines Corporation, Armonk, NY (US)

(72) Inventors: Thierry Supplisson, Cork (IE); Eric Thiebaut-George, Cork (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 15/160,321

(22) Filed: May 20, 2016

(65) Prior Publication Data

US 2016/0266956 A1 Sep. 15, 2016

Related U.S. Application Data

(63) Continuation of application No. 13/906,376, filed on May 31, 2013, now Pat. No. 9,760,425.

(30) Foreign Application Priority Data

May 31, 2012 (GB) .................................. 1209660.8

(51) Int. Cl.
*G06F 11/07* (2006.01)
*H04L 12/24* (2006.01)

(52) U.S. Cl.
CPC ........ *G06F 11/079* (2013.01); *G06F 11/0751* (2013.01); *G06F 11/0787* (2013.01); *H04L 41/069* (2013.01); *H04L 41/0622* (2013.01)

(58) Field of Classification Search
CPC ............. G06F 11/3466; G06F 11/3636; G06F 11/3604; G06F 11/3452; G06F 2201/865
See application file for complete search history.

(56) References Cited

U.S. PATENT DOCUMENTS 6,665,262 B1 12/2003 Lindskog et al.
7,606,895 B1 10/2009 Dini et al.
(Continued)

FOREIGN PATENT DOCUMENTS

WO 2003005279 1/2003

OTHER PUBLICATIONS

IP.com Database; "Autonomic Network Performance Management System providing Efficient Data Collection"; IP.com Disclosure No. IPCOM000192206D; abstract; Jan. 20, 2010.
(Continued)

*Primary Examiner* — Jigar Patel
(74) *Attorney, Agent, or Firm* — James L. Baudino

(57) ABSTRACT

Data lifecycle management is performed by managing metrics from a monitored system. A fault is identified from the monitored system. One or more metrics that are directly related to the fault and one or more metrics that are indirectly related to the fault by virtue of being directly or indirectly related to the one or more directly related metrics are identified and stored in a memory. A lifespan condition associated with the fault is identified. A lifespan for each of the directly and indirectly related metrics based on the identified lifespan condition is added or changed. A metric that is critically related to another metric will inherit the same lifespan, and a metric that is related but not critically related to another metric will not inherit the other metric's lifespan. Metrics are removed from the memory if their associated lifespans are over.

20 Claims, 10 Drawing Sheets

(56) References Cited

U.S. PATENT DOCUMENTS

| | | | |
|---|---|---|---|
| 7,757,215 B1* | 7/2010 | Zhou | G06F 11/3644 714/2 |
| 2002/0144101 A1* | 10/2002 | Wang | G06F 9/3802 712/240 |
| 2003/0126256 A1 | 7/2003 | Cruickshank, III et al. | |
| 2007/0027985 A1 | 2/2007 | Ramany et al. | |
| 2007/0168505 A1 | 7/2007 | Devadoss et al. | |
| 2008/0104248 A1 | 5/2008 | Yahiro et al. | |
| 2013/0060730 A1* | 3/2013 | Bailey, Jr. | G06F 11/3476 707/609 |
| 2013/0275518 A1* | 10/2013 | Tseitlin | G06F 11/36 709/206 |

OTHER PUBLICATIONS

IP.com Database; "A System and Method to Capture, Index and Identify Network Faults"; IP.com Disclosure No. IPCOM000179821D; abstract; Feb. 26, 2009.

IP.com Database; "Network performance measurement with periodic streams (RFC3432)"; IP.com Disclosure No. IPCOM000010457D; abstract; Nov. 1, 2002.

* cited by examiner

DATA LIFECYCLE MANAGEMENT

BACKGROUND

Management of computer networks and network elements has become increasing more complex over the years just as the elements and networks have increased in complexity. It is not sufficient to state that a network element or link between elements is "up" as opposed to "down". The performance of each network element and link between elements needs to be assessed in order to provide a complete view of the network. In order to assess performance, key performance indicators (KPIs) are used.

KPIs can include items such as "equipment temperature" to "traffic" and "dropped calls". In wireless networks, it is very common for a single element to offer several thousand such KPIs. As many different network elements can constitute the complete network, the total domain of available KPIs can very quickly reach tens of thousands to hundreds of thousands KPIs, each collected per network element and for each time interval (for example every 5 to 15 minutes).

Network performance management applications collect all these KPIs for each monitored network element on a periodical basis (for example every hour or every 15 minutes). This collection can very quickly lead to over a billion KPIs to monitor, on a daily basis. The multiplication of KPIs can therefore mean that a very large computer will be needed in order to collect, store, manage and report on this amount of data. Furthermore, in composite application management, a central system often collects information from several, disparate and heterogeneous sources, processes this combined information as a whole, and generates alarms when faults are detected.

The user then expects to be able to drill down from a fault to the historical KPI values in order to investigate the fault. One example of a known system is US patent publication 2008/0104248 for a computer system and method for monitoring performance of the computer system. This and other metric systems store metrics for several weeks, months or years, and this data is not associated with any alarm and therefore never reported on, leading to wasted space and resources on the monitoring machine.

BRIEF SUMMARY

Embodiments of the present invention disclose a method, system, and computer program product for data lifecycle management by managing metrics from a monitored system. A fault is identified from the monitored system. One or more metrics that are directly related to the fault and one or more metrics that are indirectly related to the fault by virtue of being directly or indirectly related to the one or more directly related metrics are identified and stored in a memory. A lifespan condition associated with the fault is identified. A lifespan for each of the directly and indirectly related metrics based on the identified lifespan condition is added or changed. A metric that is critically related to another metric will inherit the same lifespan, and a metric that is related but not critically related to another metric will not inherit the other metric's lifespan. Metrics are removed from the memory if their associated lifespans are over.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
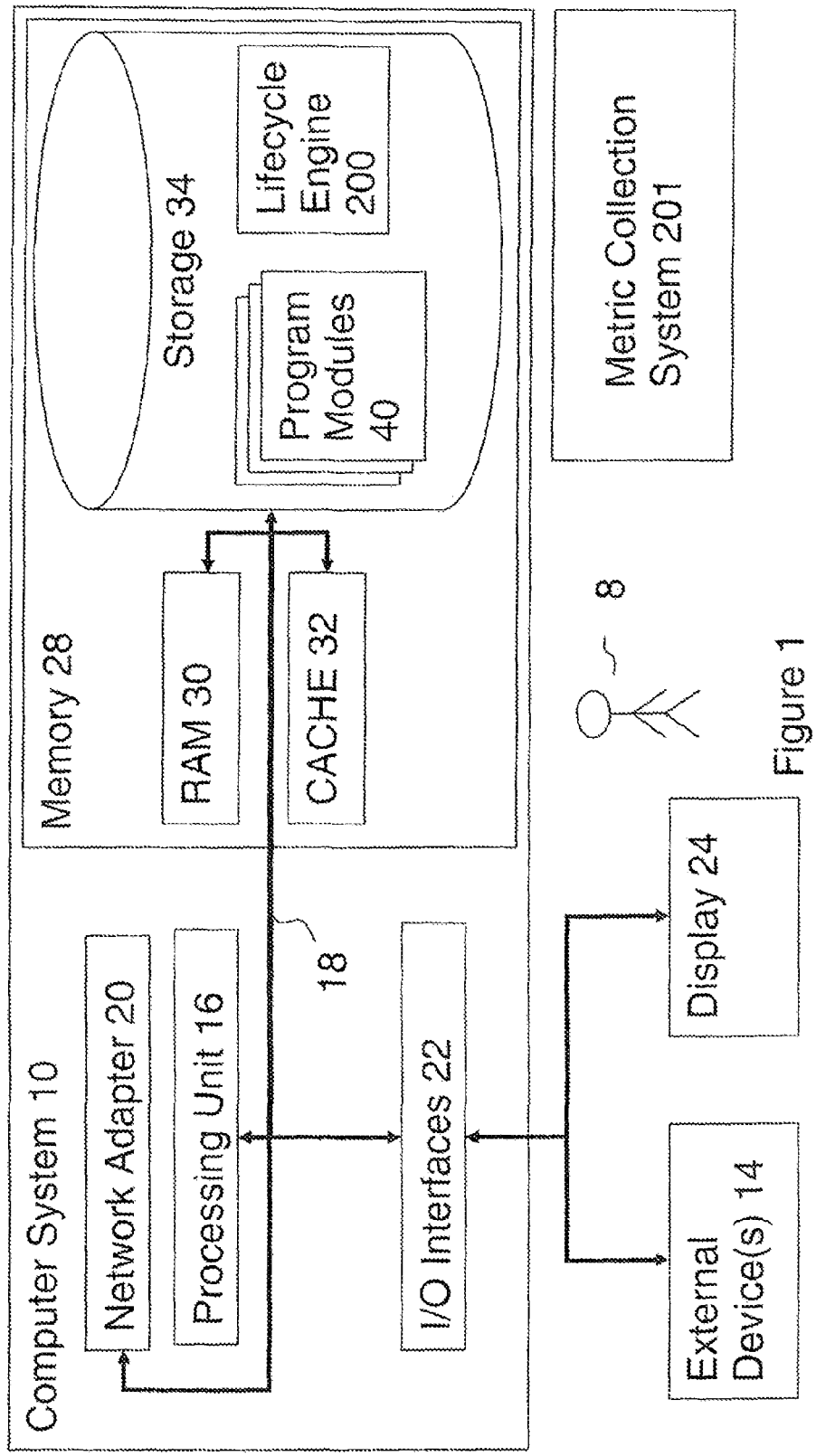
FIG. 1 is a deployment diagram of an embodiment of a system in accordance with the present disclosure.

Embodiments of the present disclosure provide a method, system and computer program product for data lifecycle management. For example, in some embodiments, a method for managing metrics from a monitored system comprises: identifying a fault from the monitored system; identifying from the monitored system, one or more metrics are that are directly related to the fault and one or more metrics that are indirectly related to the fault by virtue of being directly or indirectly related to the one or more directly related metrics; identifying a lifespan condition associated with the fault; adding or changing a lifespan for each of the directly and indirectly related metrics based on the identified lifespan condition; and removing metrics from the storage if their associated lifespans are over. This method provides a way to reduce the amount of data kept in the monitoring machine database and therefore reduce its overall footprint and hardware requirements. Taking these parameters into consideration, the embodiments minimize hardware footprint by minimizing the volume of redundant metrics retained.

Advantageously the lifespan condition defines a lifespan for related metrics with respect to when the fault occurred so that related metrics may be retained until a defined period after a fault. More advantageously metrics are identified within an identification period starting before and ending after the fault occurs. The identification period before the fault and period after the fault defines a window where metrics are taken to have potential relevance to the fault and are retained. Even more advantageously that part of the identification period before a fault is longer than that part of the identification period after the fault. This is particularly useful when fault tracking is an objective.

Conditions are also described as condition actions as the conditions are mostly followed by an action. Metrics can be related to other metrics in different ways and related metrics include first, second and further levels of relationship. Some relationships are considered critical to fault finding and others are not critical. In some embodiments, a metric that is critically related to another metric will inherit the same lifespan. In some embodiments, a critically related metric inherits the lifespan of a first, a second or a further level of related metric. In some embodiments, a metric that is related but not critically related to another metric will not inherit the another metric's lifespan. Furthermore a metric that is related but not critically related to another metric will have a lifespan that diminishes as the level of relationship increases. Relationships can be either explicit or implicit. For example a complex metric (often called KPI=Key Performance Indicator or KQI=Key Quality Indicator) may comprise several metrics. For example, one KPI is utilization=traffic/capacity. In this case, if an alarm is raised on the utilization, the user will be interested in drilling down to the traffic and capacity metrics. Similarly, if an alarm is raised on the traffic, the user will be interested in the utilization and capacity metrics. The embodiments ensure that related metrics are therefore assigned the same extended retention as the alarmed metric. Other relationships could be specified in some metadata or extracted from another system, for example for KQIs: a service level metric could be associated to a "% dropped calls" metric. Additionally, metrics could be implicitly related and the relationships learnt by an algorithm, such as a correlation or causation algorithm.

The term fault is used in a broad sense of mean an event indicating a failure of something a system. For instance, faults can be extended to any of: events or metrics for events in general; configuration changes; availability and faults; service level observations; detected behavioral anomalies, that is, a resource not behaving in a similar way to the way it used to. A particular case of interest is the case of sentinel metrics which might reflect a condition worth of investigation when they meet certain conditions. Similarly, the term metrics is used in the claims to cover events such as key performance indicators (KPIs), key quality indicator (KQI) and any other performance or useful monitoring data.

Suitably a lifespan of a metric is reduced or considered expired if the related fault has been resolved. Such a treatment reduces the volume of redundant metrics that are stored. A redundant metric is an obsolete metric whose lifespan has not expired. Metrics not associated with a fault have a default lifespan. Such a default lifespan is advantageously short to reduce the volume of less useful metrics that are stored. The solution defines a method that preserves a minimal amount of data by discarding early the data that is not associated to system faults.

At a high level, the solution is governed by the following parameters: amount of time to keep KPIs for "before a fault"; amount of time to keep KPIs for "after a fault"; amount of time to keep KPIs not associated with a fault; whether or not to keep KPIs associated with resolved faults; and whether or not to keep related KPIs (for example, KPIs that the faulty KPIs depend on). More suitably, removing metrics from the storage if their associated lifespans are over comprises moving metrics to an archive if a lifespan is above a threshold lifespan. The threshold lifespan is a large lifespan that is treated as being infinite for the purposes of the embodiments.

Viewed from another aspect, the present disclosure provides a system for managing metrics from a monitored system comprising: first identifying engine for identifying a fault from the monitored system; second identifying engine for identifying, from the monitored system, one or more metrics are that are directly related to the fault and one or more metrics that are indirectly related to the fault by virtue of being directly or indirectly related to the one or more directly related metrics; third identifying engine for identifying a lifespan condition associated with the fault; adding or changing a lifespan for each of the directly and indirectly related metrics based on the identified lifespan condition; and removing engine for removing metrics from the storage if their associated lifespans are over.

Viewed from a further aspect, the present disclosure provides a computer program product for managing metrics from a monitored system, the computer program product comprising: a computer readable storage medium readable by a processing circuit and storing instructions for execution by the processing circuit for performing a method for performing the steps of the disclosure.

Viewed from a further aspect, the present disclosure provides a computer program stored on a computer readable medium and loadable into the internal memory of a digital computer, comprising software code portions, when said program is run on a computer, for performing the steps of the disclosure.

Referring to FIG. 1, there is shown a deployment diagram of the preferred embodiment within a computer system 10. Computer system 10 is operational with numerous other general purpose or special purpose computing system environments or configurations. Examples of computing systems, environments, and/or configurations that may be suitable for use with computer system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 10 may be described in the general context of computer system executable instructions, such as program modules, being executed by a computer system. Generally, program modules may include routines, programs, objects, components, logic, data structures, and so on that perform particular tasks or implement particular abstract data types. Computer system 10 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer system 10 is shown in the form of a general-purpose computing device. The components of computer system 10 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 10 typically includes a variety of computer system readable media. Such media may be any available media that is accessible by computer system 10, and it includes both volatile and non-volatile media, removable and non-removable media.

System memory 28 comprises readable volatile memory such as random access memory (RAM) 30 and cache memory 32 and also non-volatile or persistent storage 34. Computer system 10 may further include other removable/ non-removable, volatile/non-volatile computer system storage media. By way of example only, storage 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

A set of program modules 40, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. At least one program module 40 can be provided to carry out the functions and/or methodologies of embodiments of the invention as described herein. In the preferred embodiment, lifecycle engine 200 is a computer program configured to carry out the functions of the embodiments of the invention.

Computer system 10 may also communicate with one or more external devices 14 such as a keyboard, a pointing device, a display 24, etc.; one or more devices that enable a user 8 to interact with computer system 10; and/or any devices (e.g., network card, modem, etc.) that enable computer system 10 to communicate with one or more other computing devices. Such communication can occur via I/O interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples, include, but are not limited to: microcode, device drivers, redundant processing units, external disk drive arrays, RAID systems, tape drives, and data archival storage systems.

In a preferred embodiment of the present invention, metric collection system 201 comprises an external lifecycle engine. In another embodiment a metric collection system comprises an integrated lifecycle engine.

Figure 2:
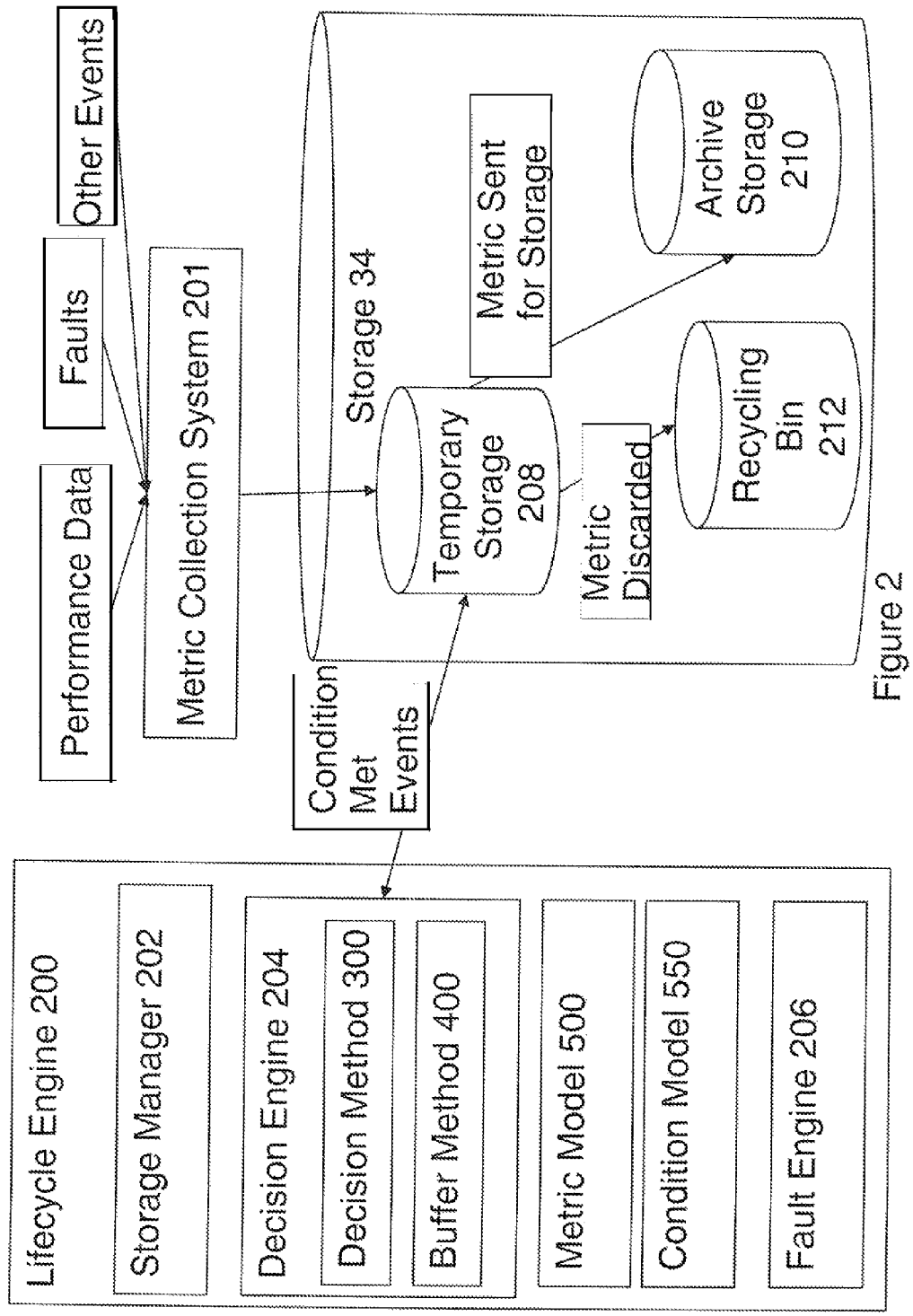
FIG. 2 is a component diagram of an embodiment of a system in accordance with the present disclosure.

Referring to FIG. 2, the preferred embodiment is a lifecycle engine 200 in the form of a computer program comprising: storage manager 202; decision engine 204, metric model 500; condition model 550; and fault engine 206. Metric collection system 201 is shown collecting performance data, fault data and other events and feeding corresponding metrics into temporary storage 208 independently of the embodiment.

Storage 34 stores life cycle engine 200 before execution. On execution, a copy of life cycle engine 200 is placed in cache memory 32 for execution and data structures used by the embodiments are created in the storage system 32. The data structures comprise: temporary storage 208; archive storage 210 and bin 212. Storage manager 202 is for creating and managing data structures including temporary storage 208; archive storage 210 and bin 212 created in storage system 34. Metric collection system 201 is for feeding events directly to temporary storage 208.

Decision engine 204 is for deciding management actions on each event and performing those management actions so to retain, archive or discard the event. Decision engine 204 comprises: decision method 300 for choosing the management action and buffer method 400 for performing the management action. Metric model 500 is for storing metrics and associations between metrics. Condition model 550 is for storing conditions and associations with metrics. Fault engine 206 is for associating types of metric with a fault or metric with certain conditions with a fault.

Figure 3:
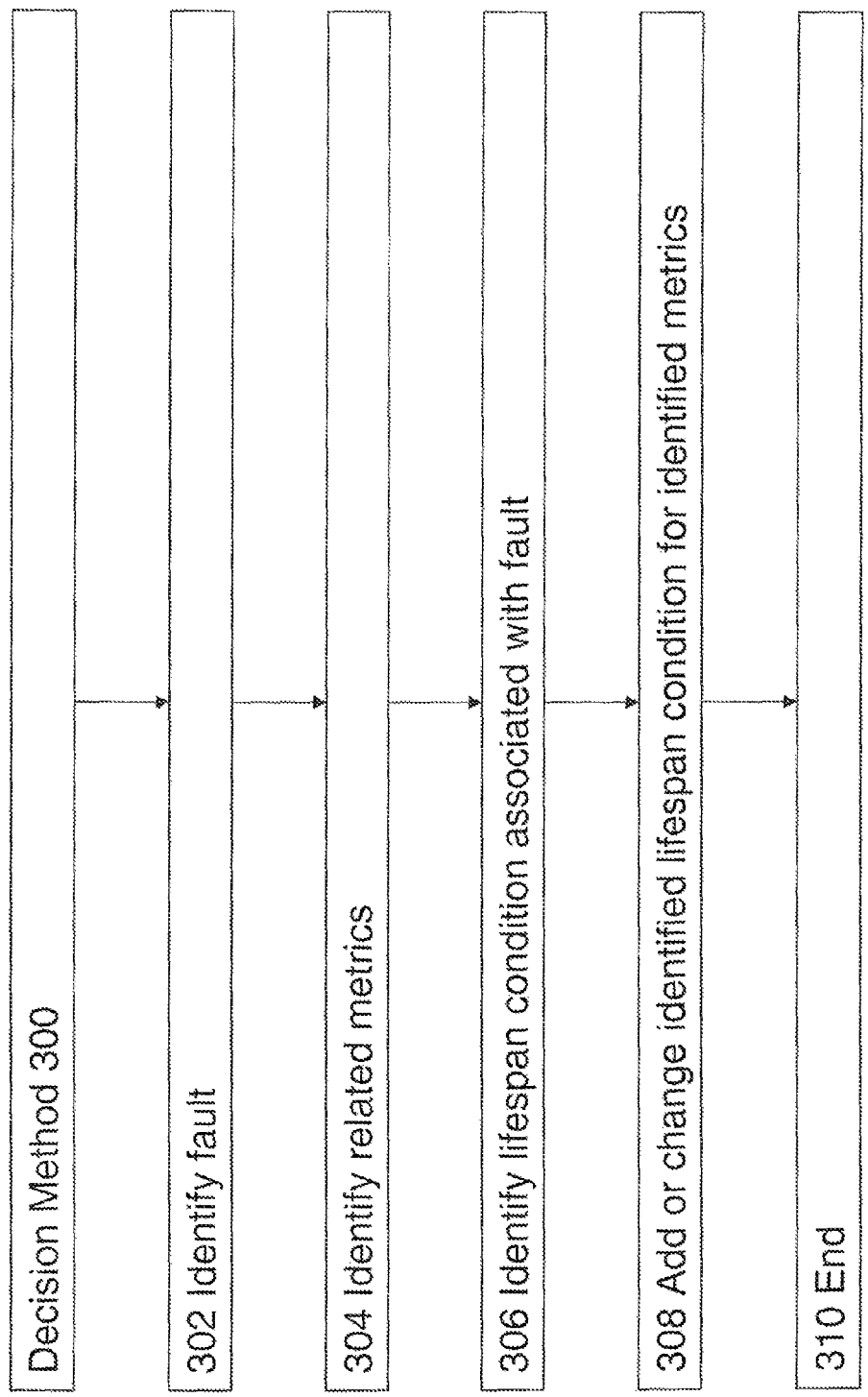
FIG. 3 is a flow diagram of a decision method in accordance with an embodiment of the present disclosure.

Referring to FIG. 3, the decision method 300 of the preferred embodiment comprises logical process steps 302 to 310. Step 302 is for identifying a fault from the monitored system. Step 304 is for identifying one or more metrics that are directly related to the fault and one or more metrics that are indirectly related to the fault by virtue of being directly or indirectly related to the one or more directly related metrics. The metrics are all received from the monitored system in order that they may be scanned by decision method 300. Step 306 is for identifying a lifespan condition associated with the fault. Step 308 is for adding or changing a lifespan for each of the directly and indirectly related metrics based on the identified lifespan condition. Step 310 is the end of decision method 300.

Figure 4:
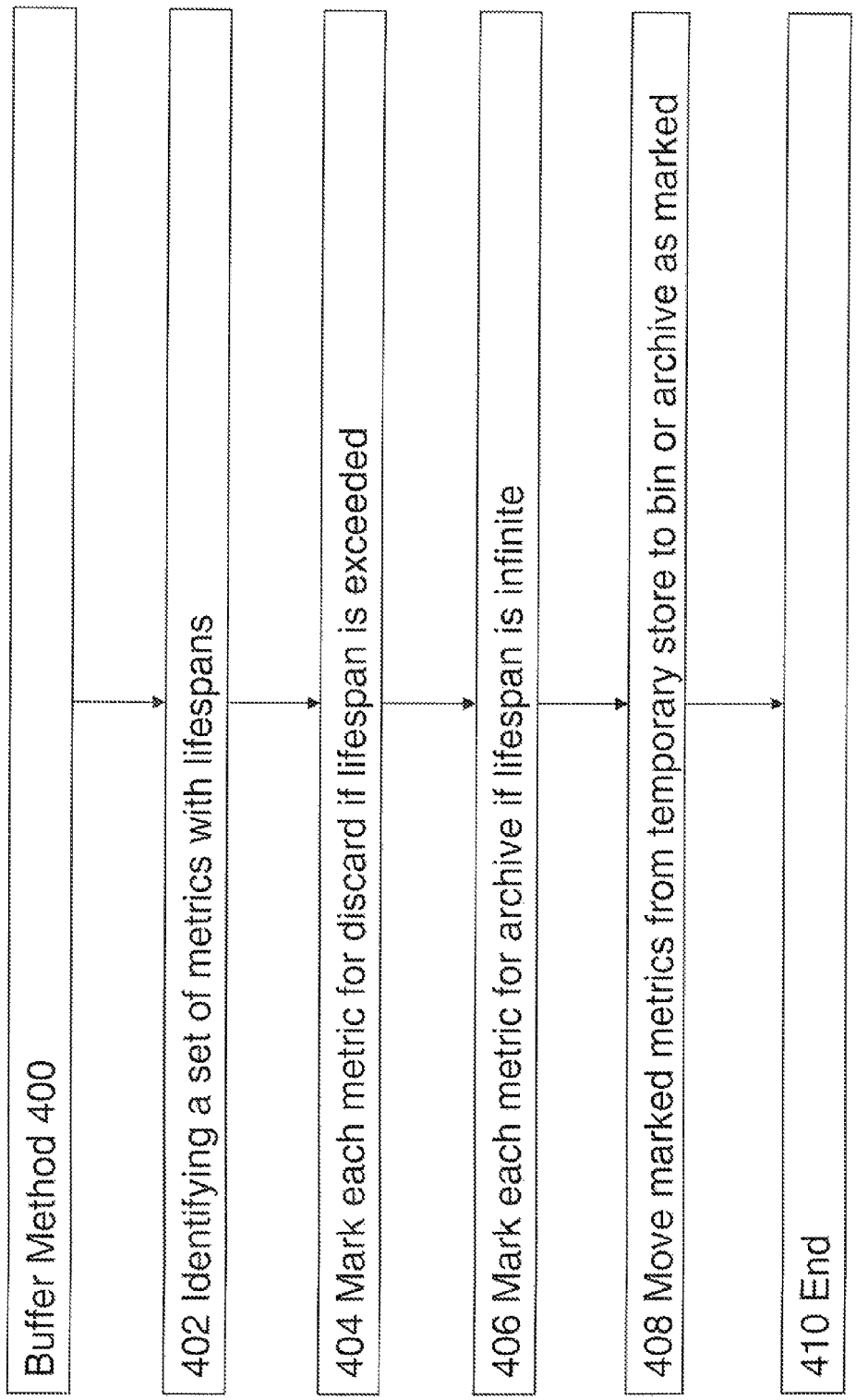
FIG. 4 is a flow diagram of a buffer method in accordance with an embodiment of the present disclosure.

Referring to FIG. 4, buffer method 400 of the preferred embodiment comprises logical process steps 402 to 410. Step 402 is for identifying a set of metrics with lifespans. Step 404 is for marking each metric for discarding if its associated lifespan is exceeded. Step 406 is for marking each metric for archive if the lifespan is above a certain threshold. When over the threshold value, a lifespan is assumed to be infinite and therefore suitable for archiving. Step 408 is for moving marked metrics from the temporary storage 208 to recycling bin 212 or archive storage 210 depending on the marking. Step 410 is the end of buffer method 400.

Figure 5:
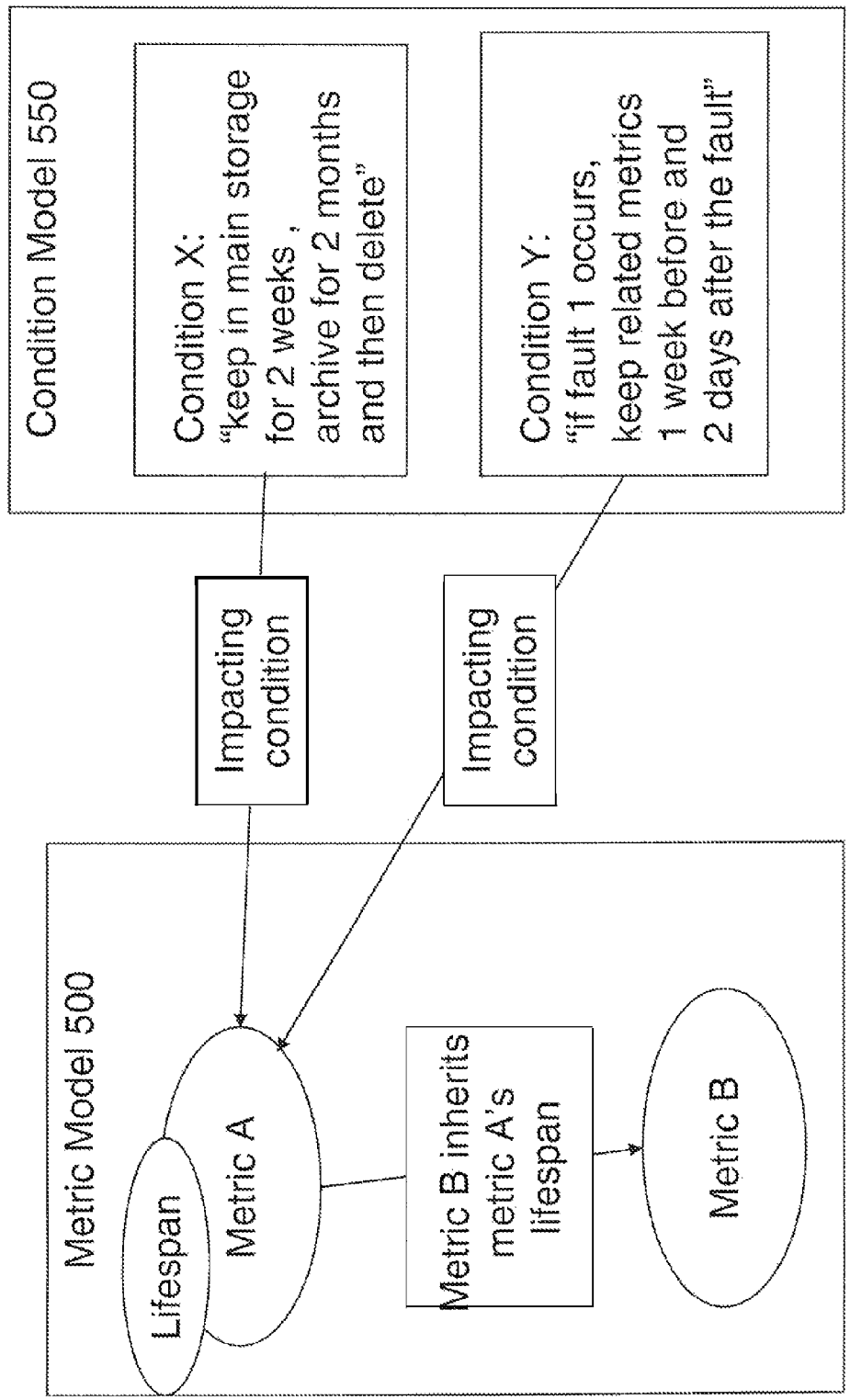
FIG. 5 is a schematic of an example metric model and condition model in accordance with an embodiment of the present disclosure.

Referring to FIG. 5, metric model 500 and condition model 550 are described by way of a simple example. Metric model 500 comprises: a relational model of metrics and lifespans associated with each metric. The relation model comprises data on how each metric inherits lifespans, or not, from other metrics depending on the relationships. FIG. 5 shows a graph of metric A and metric B whereby metric B is a dependent of metric A as shown by the labeled arrow from metric A to metric B. Actual cases will be more complex and the simple example is for illustration only.

Condition model 550 comprises conditions and associations with metrics. FIG. 5 shows two conditions, X and Y, having association with metric A as shown by the arrows from condition X and condition Y to metric A. Typically there are two different types of conditions: a retention condition for each metric (either global or per metric) independent from faults; and a retention condition dependent on faults. An example of the fault independent condition is condition X: "keep in main storage for 2 weeks, archive for 2 months and then delete". An example of a fault dependent condition is condition Y: "if fault 1 occurs, keep related metrics 1 week before and 2 days after the fault".

Figure 6:
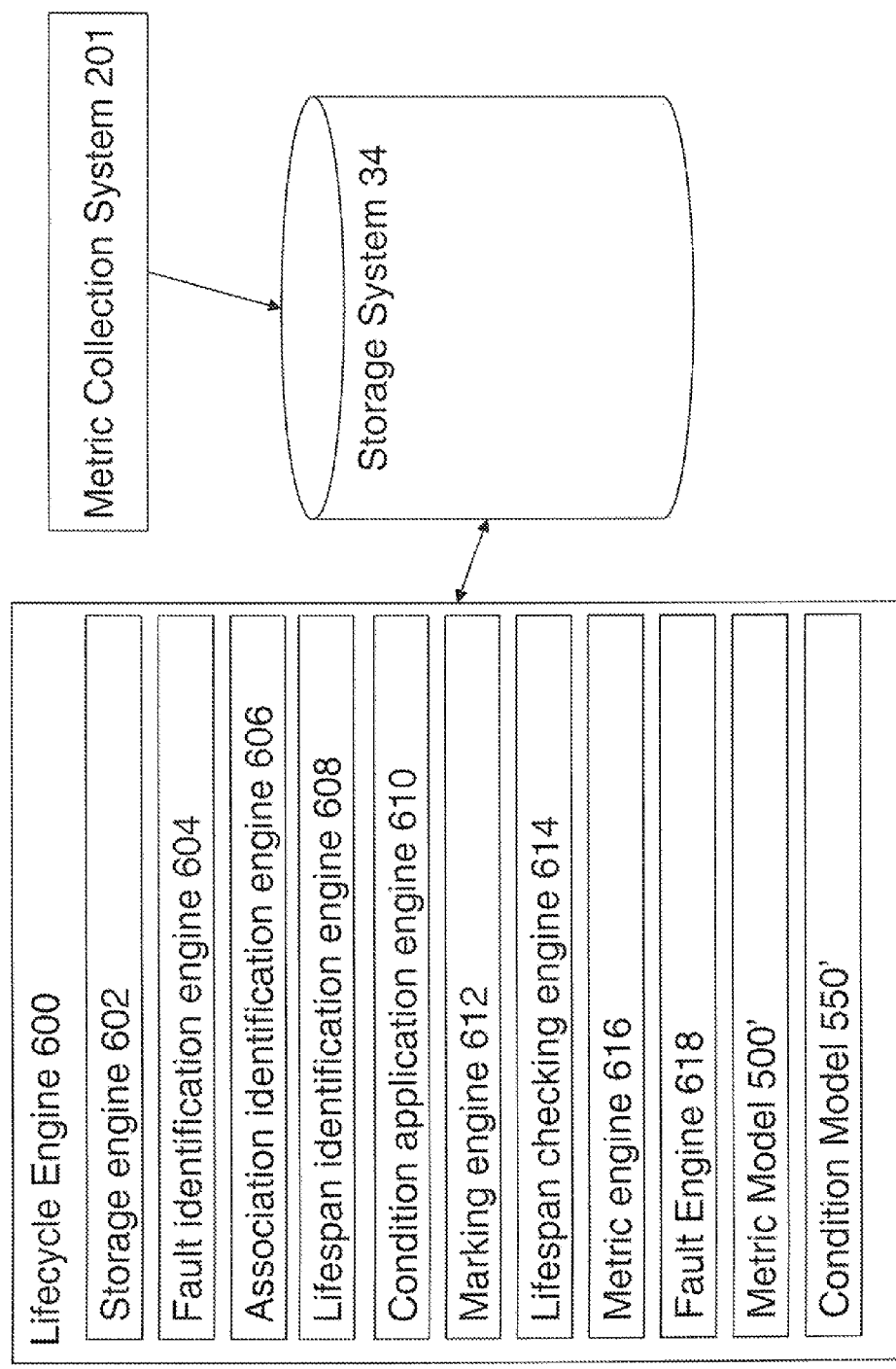
FIG. 6 is a component diagram of another embodiment of a system in accordance with the present disclosure.

Referring to FIG. 6, a second embodiment is a life cycle engine 600 in the form of a collection of logical engines or other logical system elements comprising: storage engine 602; fault identification engine 604; association identification engine 606; lifespan identification engine 608; condition application engine 610; marking engine 612; lifecycle checking engine 614; metric engine 616; fault engine 618;

metric model 500'; and condition model 550'. Storage system 34 stores metrics from metric collection system 201 as with the first embodiment. It will be equally clear to one of skill in the art that some or all of the functional components of the preferred embodiment may suitably be embodied in alternative logic apparatus or apparatuses of a second embodiment. Such a second embodiment comprises logic elements to perform equivalent functionality using equivalent method steps, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

Storage engine 602 is for creating and managing data structures necessary for the embodiments. The data structures comprise: temporary storage; permanent storage and bin created in storage system 34. Fault identification engine 604 is for identifying a fault from the monitored system. Association identification engine 606 is identifying from the monitored system, one or more metrics are that are directly related to the fault and one or more metrics that are indirectly related to the fault by virtue of being directly or indirectly related to the one or more directly related metrics. Lifespan identification engine 608 is for identifying a lifespan condition associated with the fault. Condition application engine 610 is for adding or changing a lifespan for each of the directly and indirectly related metrics based on the identified lifespan condition. Marking engine 612 is for marking a metric for discard if a lifespan is exceeded or for marking a metric for archive if a lifespan is above a threshold to be considered for the archive. Lifespan checking engine 614 is for moving metrics to the recycle bin or to the archive as marked. Fault engine 618 is for associating types of metric with a fault or metric with certain conditions with a fault. Metric model 500' is for storing metrics and associations between metrics. Condition model 550' is for storing conditions and associations with metrics.

Figure 7:
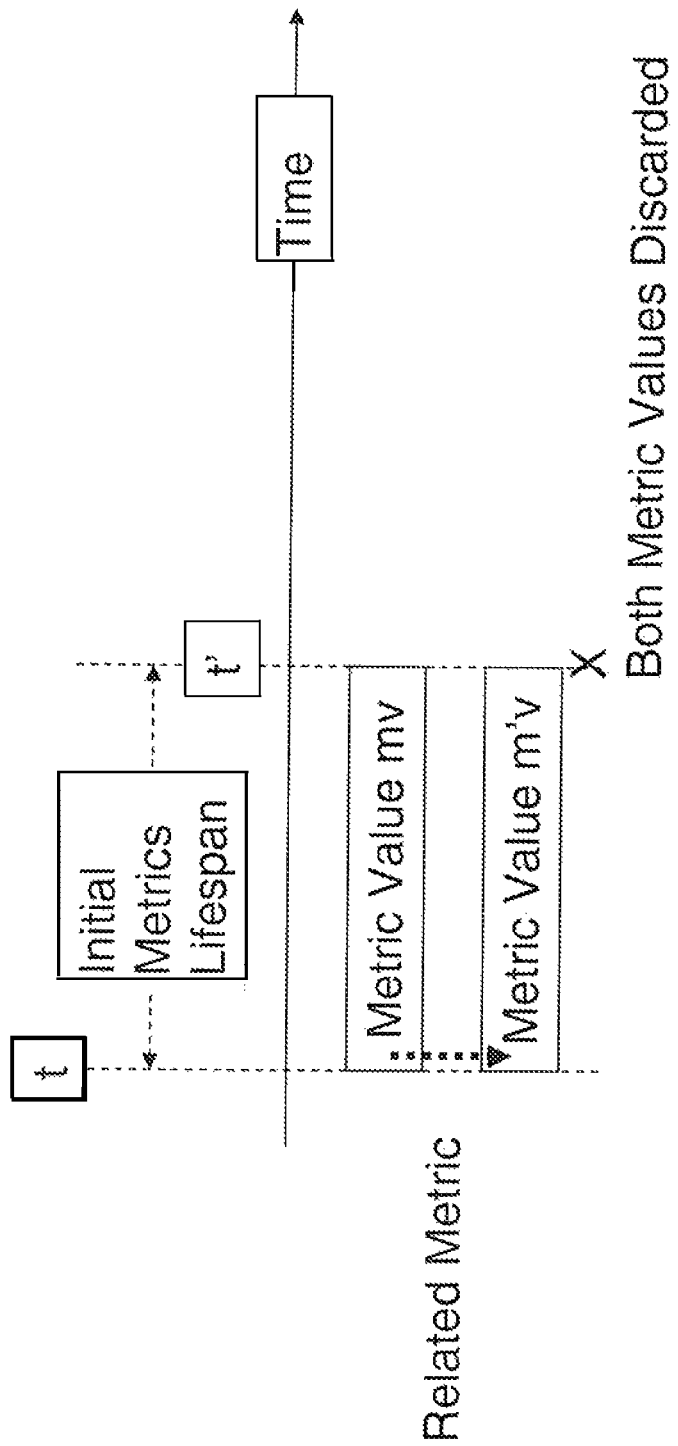
FIGS. 7 and 8 are examples of metrics and their associated lifecycles according to embodiments of the present disclosure.

Referring to FIG. 7, there is shown an example of two related metrics (mv and m'v) stored between time=t and time=t' and discarded at time=t' after the initial metric lifespan has been exceeded. Both metrics are discarded after time=t' since they were not bound to events and no condition was met.

Figure 8:
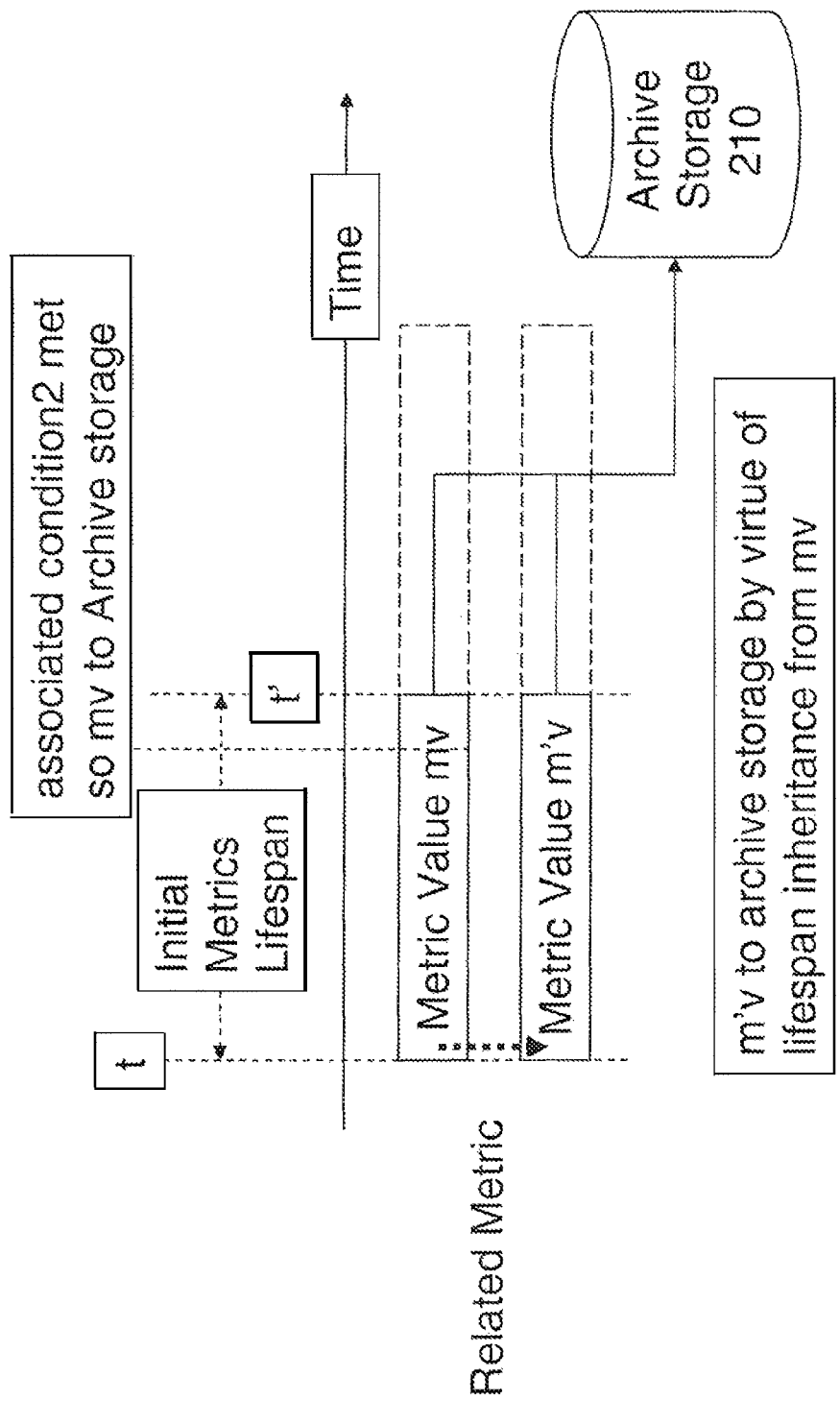

Referring to FIG. 8, there is shown an example of two related metrics (mv and m'v) archived after time=t' when the extended lifespan has expired. Metric mv had an extended lifespan due to an associated condition being met. Metric m'v had an extended lifespan by virtue of its inheritance from mv. Both metrics are marked for archiving after the extended lifespan was exceeded.

Figure 9:
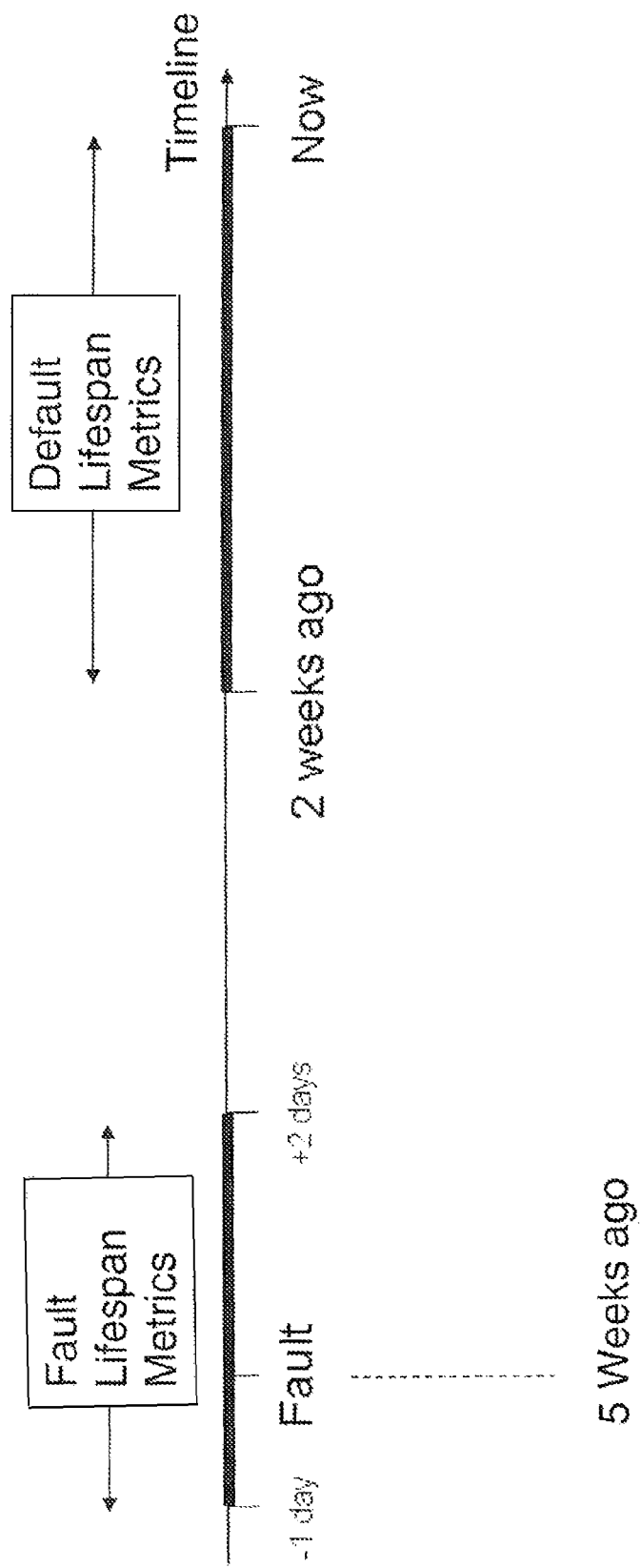
FIG. 9 is an example metric storage profile over a 5 week period in accordance with an embodiment of the present disclosure.

Referring to FIG. 9 there is shown an example schematic metric storage profile over a timeline for a particular type of metric after a fault occurred 5 weeks ago. The thin part of timeline indicates that the values have been discarded. The thick bold part of the timeline shows the preserved values for this metric. A bold timeline indicates that the lifespan of the metric has been changed so that it is still stored 1 day before and 2 days after the 5 week old fault. The same values for this metric either side of this period have been discarded as indicated by the thin timeline. The default retention period appears to be 2 weeks as indicted by the thick timeline from 0 to 2 weeks and thin time after 2 weeks.

Figure 10:
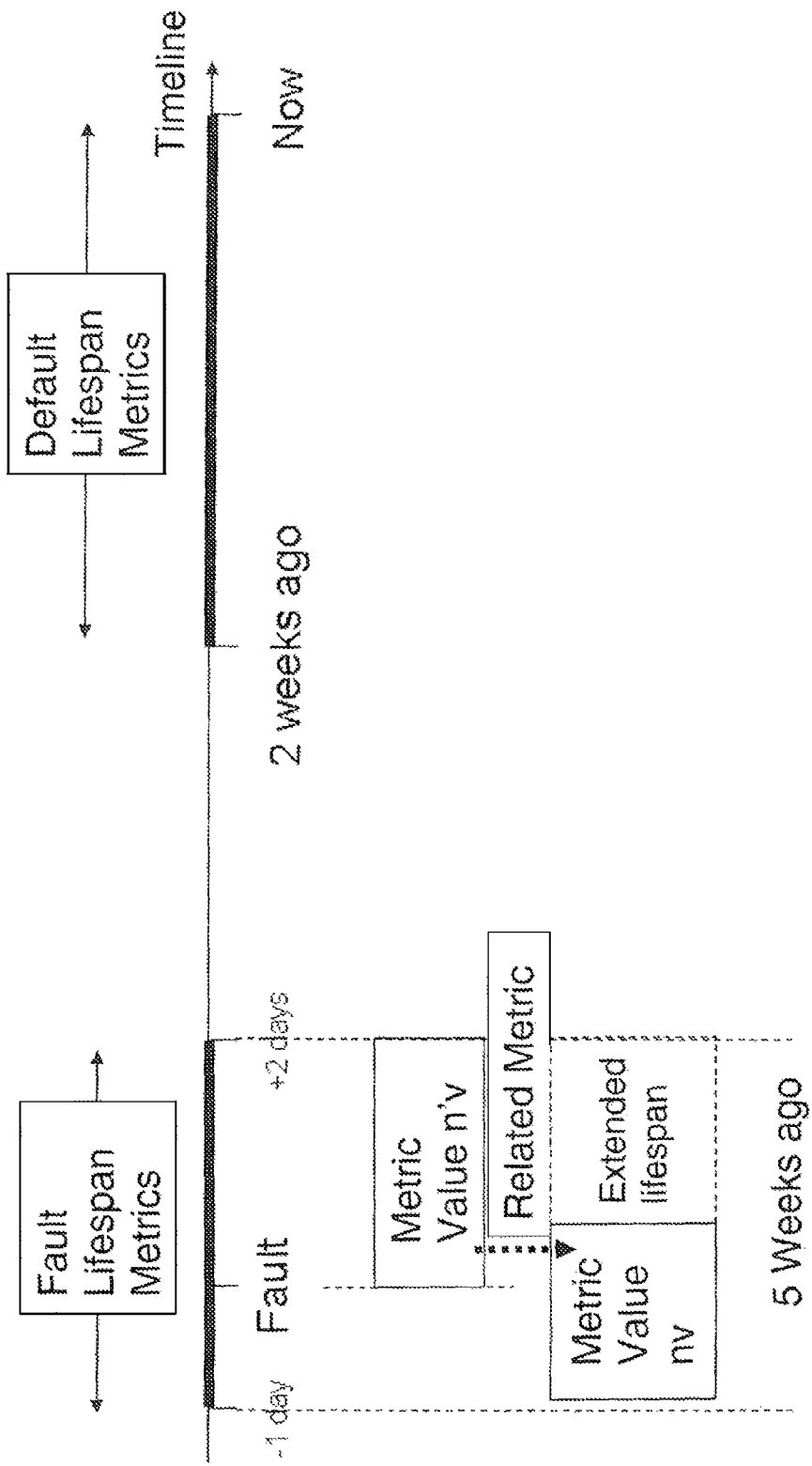
FIG. 10 is the example metric storage profile of FIG. 9 with two example related metrics in accordance with the present disclosure.

Referring to FIG. 10, there is shown the fault of FIG. 9 with two example related metrics, a first (nv) occurring before the fault and a second (n'v) occurring after the fault. The second metric (n'v) has a condition leading it to be retained for 2 days after the fault and the first metric (nv) inherits the same condition represented by the dashed extended lifespan box.

It will be appreciated that embodiments described above may also suitably be carried out fully or partially in software running on more than one processor, and that the software may be provided in the form of more than one computer program element carried on any suitable data-carrier such as a magnetic or optical disk or the like.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

The embodiments may suitably be embodied as a computer program product for use with a computer system. Such a computer program product may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein and such computer readable instructions can be written in a number of programming languages for use with many computer architectures or operating systems. Further, such instructions may be stored using any memory technology, including but not limited to, semiconductor, magnetic, or optical. Such instructions may be transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, embodiments of the present invention may be realized in the form of a computer implemented method of deploying a service comprising steps of deploying computer program code operable to, when deployed into a computer infrastructure and executed thereon, cause the computer system to perform all the steps of the method as a service for a client device.

In a further embodiment, the principle of the invention may be applied to the archive database to reduce the number of metrics in the archive database.

It will be clear to one skilled in the art that many improvements and modifications can be made to the foregoing exemplary embodiment without departing from the scope of the present invention.

What is claimed is:

1. A method for managing metrics from a monitored system comprising:
   identifying a fault from the monitored system;
   storing in a memory and identifying from the monitored system, one or more metrics that are directly related to the fault and one or more metrics that are indirectly related to the fault by virtue of being directly or indirectly related to the one or more directly related metrics;
   identifying a lifespan condition associated with the fault;
   adding or changing a lifespan for each of the directly and indirectly related metrics based on the identified lifespan condition, wherein a metric that is critically related to another metric will inherit the same lifespan, and wherein a metric that is related but not critically related to another metric will not inherit the another metric's lifespan; and
   removing metrics from the memory if their associated lifespans are over.

2. The method according to claim 1, wherein the lifespan condition defines a lifespan for related metrics with respect to when the fault occurred so that related metrics may be retained until a defined period after a fault.

3. The method according to claim 1, wherein metrics are identified within an identification period starting before and ending after the fault occurs.

4. The method according to claim 3, wherein a part of the identification period before the fault is longer than a part of the identification period after the fault.

5. The method according to claim 1, wherein a critically related metric inherits the lifespan of a first, a second or further level of related metric.

6. The method according to claim 1, wherein a metric that is related but not critically related to another metric will have a lifespan that diminishes as the level of relationship increases.

7. The method according to claim 1, wherein a lifespan of a metric is reduced or considered expired if the related fault has been resolved.

8. The method according to claim 1, wherein removing metrics from the memory if their associated lifespans are over comprises moving metrics to an archive if a lifespan is above a threshold lifespan.

9. A system for managing metrics from a monitored system comprising:
   a memory;
   a first identifying engine for identifying a fault from the monitored system;
   a second identifying engine for storing in the memory and identifying, from the monitored system, one or more metrics are that are directly related to the fault and one or more metrics that are indirectly related to the fault by virtue of being directly or indirectly related to the one or more directly related metrics;
   a third identifying engine for identifying a lifespan condition associated with the fault;
   an application engine for adding or changing a lifespan for each of the directly and indirectly related metrics based on the identified lifespan condition, wherein a metric that is critically related to another metric will inherit the same lifespan, and wherein a metric that is related but not critically related to another metric will not inherit the another metric's lifespan; and
   a removing engine for removing metrics from the memory if their associated lifespans are over.

10. The system according to claim 9, wherein the lifespan condition defines a lifespan for related metrics with respect to when the fault occurred so that related metrics may be retained until a defined period after a fault.

11. The system according to claim 9, wherein metrics are identified within an identification period starting before and ending after the fault occurs.

12. The system according to claim 11, wherein a part of the identification period before the fault is longer than a part of the identification period after the fault.

13. The system according to claim 9, wherein a critically related metric inherits the lifespan of a first, a second or further level of related metric.

14. The system according to claim 9, wherein a metric that is related but not critically related to another metric will have a lifespan that diminishes as the level of relationship increases.

15. A computer program product for managing metrics from a monitored system, said computer program product comprising a non-transitory computer readable medium having computer readable code stored thereon executable by a processor to:
   identify a fault from the monitored system;
   store in a memory and identifying from the monitored system, one or more metrics are that are directly related to the fault and one or more metrics that are indirectly related to the fault by virtue of being directly or indirectly related to the one or more directly related metrics;
   identify a lifespan condition associated with the fault;
   add or change a lifespan for each of the directly and indirectly related metrics based on the identified lifespan condition, wherein a metric that is critically related to another metric will inherit the same lifespan, and wherein a metric that is related but not critically related to another metric will not inherit the another metric's lifespan; and
   remove metrics from the memory if their associated lifespans are over.

16. The computer program product according to claim 15, wherein the computer readable code is executable by the processor to identify metrics within an identification period starting before and ending after the fault occurs.

17. The computer program product according to claim 15, wherein a part of the identification period before the fault is longer than a part of the identification period after the fault.

18. The computer program product according to claim 15, wherein the lifespan condition defines a lifespan for related metrics with respect to when the fault occurred so that related metrics may be retained until a defined period after a fault.

19. The computer program product according to claim 15, wherein a metric that is related but not critically related to another metric will have a lifespan that diminishes as the level of relationship increases.

20. The computer program product according to claim 15, wherein the computer readable code is executable by the processor to remove metrics from the memory if their associated lifespans are over by moving metrics to an archive if a lifespan is above a threshold lifespan.

* * * * *